(12) United States Patent
LaVigne et al.

(10) Patent No.: US 7,570,640 B2
(45) Date of Patent: Aug. 4, 2009

(54) LOCATING ORIGINAL PORT INFORMATION

(75) Inventors: Bruce E. LaVigne, Roseville, CA (US);
Mark Gooch, Roseville, CA (US); Alan R. Albrecht, Granite Bay, CA (US);
Steven G. Jorgensen, Newcastle, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 366 days.

(21) Appl. No.: 11/784,664

(22) Filed: Apr. 9, 2007

(65) Prior Publication Data

US 2008/0247380 A1 Oct. 9, 2008

(51) Int. Cl.
*H04L 12/28* (2006.01)
*H04L 12/56* (2006.01)

(52) U.S. Cl. .................. 370/389; 370/392; 370/474; 709/238

(58) Field of Classification Search ................ None
See application file for complete search history.

(56) References Cited

U.S. PATENT DOCUMENTS

| | | | |
|---|---|---|---|
| 6,647,004 B2 * | 11/2003 | Allen et al. ............ | 370/335 |
| 6,763,018 B1 | 7/2004 | Puthiyandyil et al. | |
| 7,103,045 B2 | 9/2006 | Lavigne et al. | |
| 7,111,072 B1 | 9/2006 | Matthews et al. | |
| 7,159,242 B2 | 1/2007 | Genty et al. | |
| 2002/0032797 A1 * | 3/2002 | Xu ............................. | 709/238 |
| 2002/0032798 A1 * | 3/2002 | Xu ............................. | 709/238 |
| 2002/0035639 A1 * | 3/2002 | Xu ............................. | 709/238 |
| 2003/0023876 A1 * | 1/2003 | Bardsley et al. ............ | 713/201 |
| 2003/0046419 A1 * | 3/2003 | King et al. .................. | 709/237 |
| 2003/0070084 A1 * | 4/2003 | Satomaa et al. ............ | 713/200 |
| 2005/0114522 A1 | 5/2005 | LaVigne et al. | |
| 2005/0220091 A1 | 10/2005 | LaVigne et al. | |
| 2005/0220092 A1 | 10/2005 | LaVigne et al. | |
| 2006/0203816 A1 * | 9/2006 | O'Malley et al. ........... | 370/389 |
| 2007/0271457 A1 * | 11/2007 | Patil et al. ................... | 713/166 |
| 2007/0280222 A1 * | 12/2007 | Smith et al. ................. | 370/360 |

* cited by examiner

*Primary Examiner*—Hong Cho
*Assistant Examiner*—Robert C Scheibel

(57) ABSTRACT

A network, network devices, and methods are described for locating original port information. A network device includes a network chip having a number of network ports for the device for receiving and transmitting packets. The network chip includes logic to locate original port information for a packet returned from a checking functionality.

20 Claims, 7 Drawing Sheets

LOCATING ORIGINAL PORT INFORMATION

BACKGROUND

Computing networks can include multiple network devices such as routers, switches, hubs, servers, desktop PCs, laptops, and workstations, and peripheral devices, e.g., printers, facsimile devices, and scanners, networked together across a local area network (LAN) and/or wide area network (WAN).

Networks can include an intrusion system (IS), e.g., intrusion prevention system (IPS) and/or intrusion detection system (IDS), that serves to detect unwanted intrusions/activities to the computer network. As used herein, "IS" is used to indicate intrusion system(s), i.e., both the singular and plural. Unwanted network intrusions/activities may take the form of attacks through computer viruses and/or hackers, and misconfigured devices, among others, trying to access the network. To this end, an IS can identify different types of suspicious network traffic and network device usage that can not be detected by a conventional firewall. This includes network attacks against vulnerable services, data driven attacks on applications, host-based attacks such as privilege escalation, denial of service attacks, port scans, unauthorized logins and access to sensitive files, viruses, Trojan horses, and worms, among others.

In previous approaches, to identify suspicious network traffic, data traffic needs to pass through a point of the network where an IS is located. Previously an IS would have been deployed solely as a standalone in-line device. For large network systems, placing an IS in-line with initial client and/or server attach points, in an intended packet path, can be both expensive to implement and very complex to maintain. If the IS is not "in-line", e.g., between one port and another in a network packet's intended path, then suspicious activity may not be detected.

More recently, an IS is located integral to a network device, e.g., an IDS integral to a switch, router, etc. However, the integral IDS configuration suffers many of the same drawbacks as the in-line IS configuration where all network devices in a network are not so protected. This scheme still disperses the IS function, and can still be expensive to implement and/or complex to maintain.

DETAILED DESCRIPTION

Figure 1:
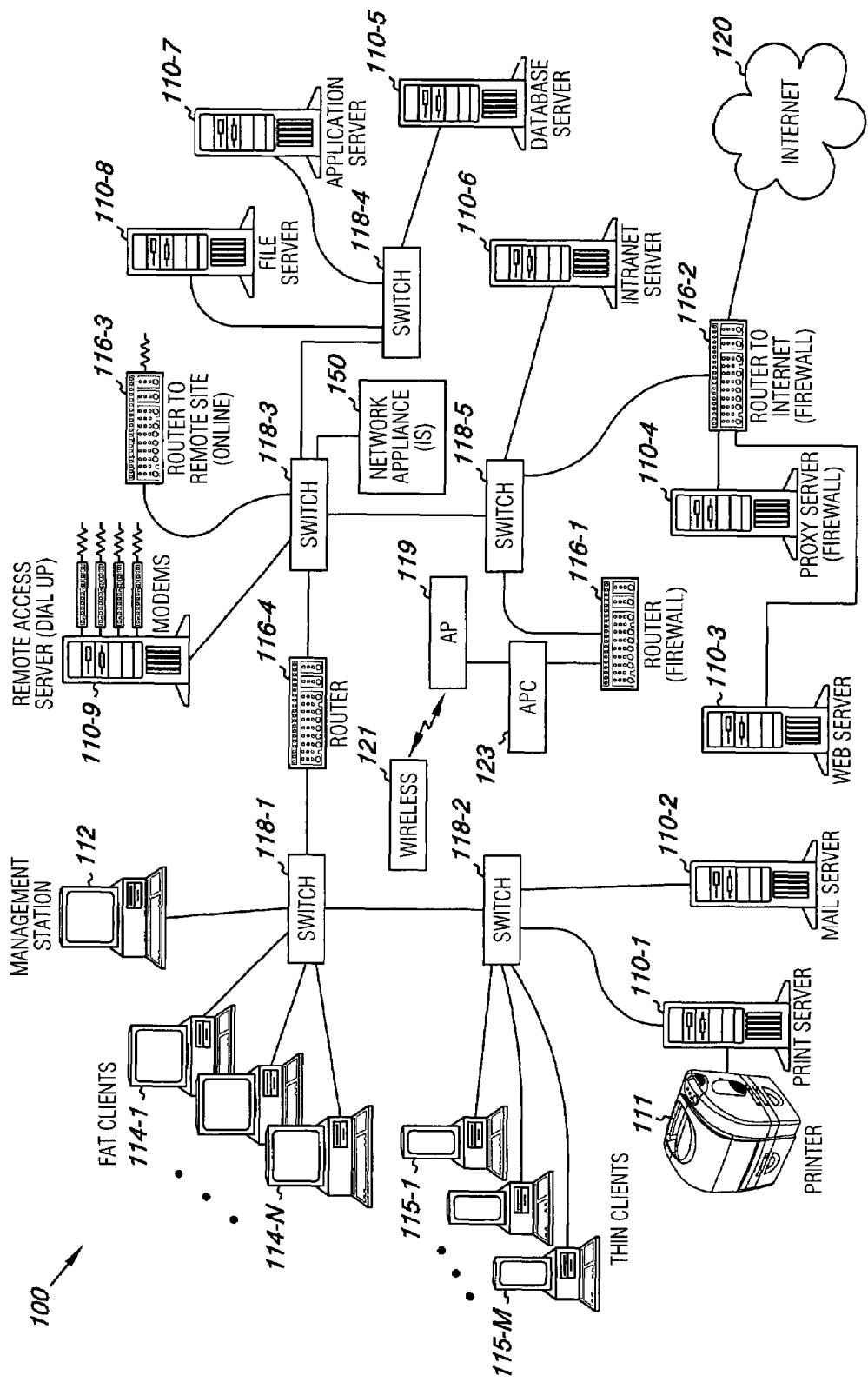
FIG. 1 is an example of a computing device network in which some embodiments of the invention can be implemented.

Sharing an IS resource among many network devices has the potential advantage to increase the scope of network protection, while reducing expense and user-level complexity, by eliminating the need for dedicated IS resources dispersed throughout the network. However, implementing a centralized IS function requires routing network traffic to the IS resource rather than physically locating the IS resource in the flow of network traffic.

Co-pending, co-assigned U.S. patent application Ser. No. 11/712,706, entitled, "Packet Tunneling, filed on Mar. 1, 2007, having common inventorship, describes tunneling packets off to a network appliance and back. When packets are tunneled off to a remote network appliance and then returned to be forwarded normally, the packet is in some ways different, e.g., instead of arriving on the original input port it is exiting the return tunnel. Thus, ingress port information has been lost.

Embodiments of the invention may include networks, network devices, systems, methods, and other embodiments, including executable instructions and/or logic. According to one embodiment, a network device includes a network chip having a number of network ports for the device for receiving and transmitting packets. The network chip includes logic to locate original port information for a packet returned from a checking functionality. Original port information may include Virtual Local Area Network (VLAN) information, and/or other source port filter information associated with the initial ingress port. In some embodiments, the logic performs a lookup to obtain original port information, for example, by using the packet's original media access control (MAC) source address (SA), e.g., MAC_SA.

In some embodiments, logic, e.g. hardware circuitry on an application specific integrated circuit (ASIC), is provided to receive a tunnel-encapsulated network packet returned from a checking functionality. The logic is operative to decapsulate the tunnel-encapsulated packet returned from the checking functionality. The logic is further operative to flag the packet as being returned from the checking functionality. The logic is also further operative to retrieve original, i.e., initial, port ingress information associated with the packet and utilize the original port information to then forward the packet on to its original MAC_DA using regular packet forwarding protocol. In some embodiments, the logic is operative, based on the flag, to bypass particular portions of the regular packet forwarding protocol which may have already been performed on the packet when the packet was originally received from the initial ingress port. For example, the logic is operative when a tunnel-encapsulated packet is returned from a checking functionality to bypass quality of service, metering, and/or counting processing, etc., that may have previously been performed on the packet, as part of the regular packet forwarding protocol, when the packet first arrived to the initial ingress port. One example of processing as part of the regular packet forwarding protocol which may be performed on a packet when a packet is first received from an original ingress port includes DiffServ metering and remarking of traffic based on bandwidth limits, as the same will be understood by one of ordinary skill in the art.

In some embodiments, a network device may include a loopback port. In such embodiments, when a tunnel-encapsulated packet is returned from a checking functionality, the logic is operative to forward a packet through the loopback port as part of locating, i.e., retrieving, the packet's original port information. As used herein, a loopback port means a port (possibly internal) on the network device which is configured to exit the packet from the network device and immediately return the packet to the network device, possibly through the same port. In such embodiments return of the packet through the loopback port will also subject the packet to logic on the network device which implements the methods described herein, e.g., retrieving original port information and/or bypassing particular portions of the regular packet forwarding protocol which may have already been performed on the packet when the packet was originally received from the initial ingress port.

FIG. 1 illustrates an embodiment of a computing device network 100 in which some embodiments of the invention can be implemented. As shown in FIG. 1, a number devices can be networked together in a LAN, WAN and/or metropolitan area network (MAN) via routers, hubs, switches and the like. As used herein a "network device" means a switch, router, hub, bridge, etc., e.g., a device which may have a processor and memory resources, and is connected to a network 100, as the same will be understood by one of ordinary skill in the art. Although a switch will often be used in this disclosure in describing certain embodiments of the invention, those skilled in the art will realize that embodiments may be implemented with other network devices. As the reader will appreciate, the term network device can also be used to refer to servers, PCs, etc., as illustrated further below.

The example network of FIG. 1 illustrates a print server 110-1 and printer 111 to handle print jobs for the network 100, a mail server 110-2, a web server 110-3, a proxy server (firewall) 110-4, a database server 110-5, an intranet server 110-6, an application server 110-7, a file server 110-8, and a remote access server 110-9. The examples described here do not provide an exhaustive list of servers that may be used in a network.

The network embodiment of FIG. 1 further illustrates a network management station 112, e.g., a server, PC and/or workstation, a number of "fat" clients 114-1, . . . , 114-N which can also include PCs and workstations and/or laptops, and a number of "thin" clients 115-1, . . . , 115-M. As used herein a "thin client" can refer to a computing device that performs little or no application processing and functions more as an input/output terminal. That is, in this example, a thin client generally relies on the application processing being performed on a server networked thereto. Additionally, a thin client can include a client in a server/client relationship which has little or no storage, as the same will be understood by one of ordinary skill in the art. In contrast, a "fat client" is generally equipped with processor and memory resources, to perform larger application processing and/or storage.

The designators "N" and "M" are used to indicate that a number of fat or thin clients can be attached to the network 100. The number that N represents can be the same or different from the number represented by M. The embodiment of FIG. 1, illustrates that all of these example network devices can be connected to one another and/or to other networks using routers, 116-1, 116-2, 116-3, and 116-4, and hubs and/or switches 118-1, 118-2, 118-3, 118-4, and 118-5. As noted above, such network devices can include a processor in communication with a memory and may include network chips having hardware logic, e.g., in the form of application specific integrated circuits (ASICs), associated with the number of network ports. The term "network" as used herein is not limited to the number, type, and/or quantity of network devices illustrated in FIG. 1.

Additionally as the reader will appreciate, a number of mobile devices, e.g., wireless device 121, can connect to the network 100 via a wireless air interface (e.g., 802.11) which can provide a signal link between the mobile device 121 and an access point (AP) 119. The AP 119 serves a similar role to a base station in a wireless network, as the same will be known and understood by one of ordinary skill in the art. As shown in FIG. 1, the AP 119 can be linked to an access point controller (APC) 123, as the same will be known and understood by one of ordinary skill in the art, which connects the AP 119 over a packet switched signal link, e.g. an Ethernet link, to other network devices, e.g., router 116-1.

Program instructions (e.g., computer executable instructions), as described in more detail here, can reside on various network devices. For example, program instructions in the form of firmware, application modules, and/or software (both in the form of executable instructions) can be resident on the network 100 in the memory of a network management station 112 and/or one or more routers, 116-1, 116-2, 116-3, 116-4, hubs, and/or switches 118-1, 118-2, 118-3, 1184, 118-5, etc., and can be executable by the processor(s) and/or logic (e.g., hardware in the form of transistor gates) thereon. Also, program instructions can be resident in a number of locations on various network devices in the network 100 as can be employed in a distributed computing network. A "distributed computing network" refers to the use of multiple computing devices, e.g., having processor and memory resources, in a network to execute various roles in executing instructions, e.g., application processing, etc., as described herein.

An "application module" means a self-contained hardware or software component that interacts with a larger system. As the reader will appreciate a software module may come in the form of a file and handle a specific task within a larger software system. A hardware module may be a separate set of logic, e.g., transistor/circuitry gates, that "plug-in" as a card, appliance, or otherwise, to a larger system/device.

Embodiments of the present invention, however, are not limited to any particular operating environment or to executable instructions written in a particular language or syntax. Software, application modules and/or logic, suitable for carrying out embodiments of the present invention, can be resident in one or more devices or locations or in several devices and/or locations in a network. "Software" as used herein, includes a series of executable instructions that can be stored in memory and executed by the hardware logic of a processor (e.g., transistor gates) to perform a particular task. Memory, as the reader will appreciate, can include random access memory (RAM), read only memory (ROM), non-volatile memory (e.g., Flash memory), etc.

As one of ordinary skill in the art will appreciate, each network device in the network 100 can be physically associated with a port of a switch to which it is connected. Information in the form of network packets, e.g., data packets, can be passed through the network 100. Users physically connect to the network through ports or APCs 123 on the network 100. Data frames, or packets, can be transferred between network devices by means of a network device's, e.g., switch's, logic link control (LLC)/media access control (MAC) circuitry, or "engines," as associated with ports on a network device. A network switch forwards network packets received from a transmitting network device to a destination network device based on the header information in received network packets. A network device can also forward packets from a given network to other networks through ports on one or more other network devices. As the reader will appreciate, an Ethernet network is described herein. However, embodiments are not limited to use in an Ethernet network, and may be equally well suited to other network types, e.g., asynchronous transfer mode (ATM) networks, etc.

According to embodiments described herein, a checking functionality, e.g., a network appliance intrusion system (IS) which serves to detect and/or evaluate suspicious activity, can be located in a "centralized" location in network 100. As used herein, the term "centralized" means a particular location in the network 100 accessible from a number of network devices, e.g., 118-1, . . . , 118-5, whether or not the topographical location is in-line with a given packet's intended network path or topographically central to the network 100. To further explain, in network 100 of FIG. 1, certain network devices, e.g., switches 118-1, 118-2, and 118-5, may be referred to topographically as "edge network devices" and other network devices, e.g., switches 118-3 and router 116-4, may be referred to topographically as "central network devices". As used herein, "edge network devices" topographically means network devices, e.g., 218-1, having ports connected directly to network clients, 215 and 214-1, . . . 214-N on the "edge" of a network. The network clients can include servers, "fat" and "thin" clients, including mobile network clients connected through an APC, etc., as discussed above. As used herein, "central network devices" topographically means network devices, e.g., 218-3, which are connected to other network devices, 218-2, but which are not necessarily connected directly to network clients such as 215 and 214-1, . . . 214-N, etc.

However, the term "central" in central network devices is not to be confused with the use of the term "centralized". In various embodiments, a "centralized" IS, as defined above, may be integral to or associated with an edge network device. That is, the topographical location in a given network of the IS can be in association with switch 118-1, connected to "fat" and "thin" clients, 114-1, . . . , 114-N, and 115-1, . . . , 115-M, in FIG. 1, or equally in association with switch 118-3, or switch 118-5, etc. Embodiments are not limited to the examples described herein. As one or ordinary skill in the art will appreciate, the intent is to place an IS in a topographical location in network 100 which has a sufficiently high bandwidth associated therewith relative to the bandwidth of other devices attached to the network 100 to perform a sufficient throughput associated with a particular checking functionality (defined below). As the reader will appreciate, certain so termed "edge network devices", e.g., switch 118-1, may in fact have a large network packet traffic bandwidth capability relative to other network devices, e.g., 118-3, 118-4, etc., in the network 100 so as to be worthwhile candidates for associating an IS, e.g., checking functionality, therewith. Embodiments are not limited to the examples given in connection with FIG. 1.

As used herein, the term "network appliance" is used to mean an add-on device, e.g., "plug-in" or "application module" (as defined below), to a network as contrasted with a "network device", e.g., router, switch, and/or hub, etc., which are sometimes considered more as "backbone" component devices to a network. As the reader will appreciate, a network appliance, e.g., 150 can include processor and memory resources capable of storing and executing instructions to perform a particular role or function. A network appliance can also include one or more network chips (e.g., ASICs) having logic and a number of ports, as the same will be known and understood by one of ordinary skill in the art.

In the example network implementation of FIG. 1, a network appliance 150 is shown in association with switch 118-3. The network appliance 150 serves as a checking functionality. In certain embodiments, the "checking functionality" performed by the network appliance 150 can perform the role of an intrusion prevention system (IPS), as may be supplied by a third party vendor of network security devices. In certain embodiments, the checking functionality performed by the network appliance 150 can perform the role of an intrusion detection system (IDS), or another diagnostic device, accounting device, counting device, etc., as may be supplied by a third party vendor. Embodiments are not limited to the examples given here. The various configurations and operations of such different checking functionalities are known and understood by one of ordinary skill in the art.

Figure 2:
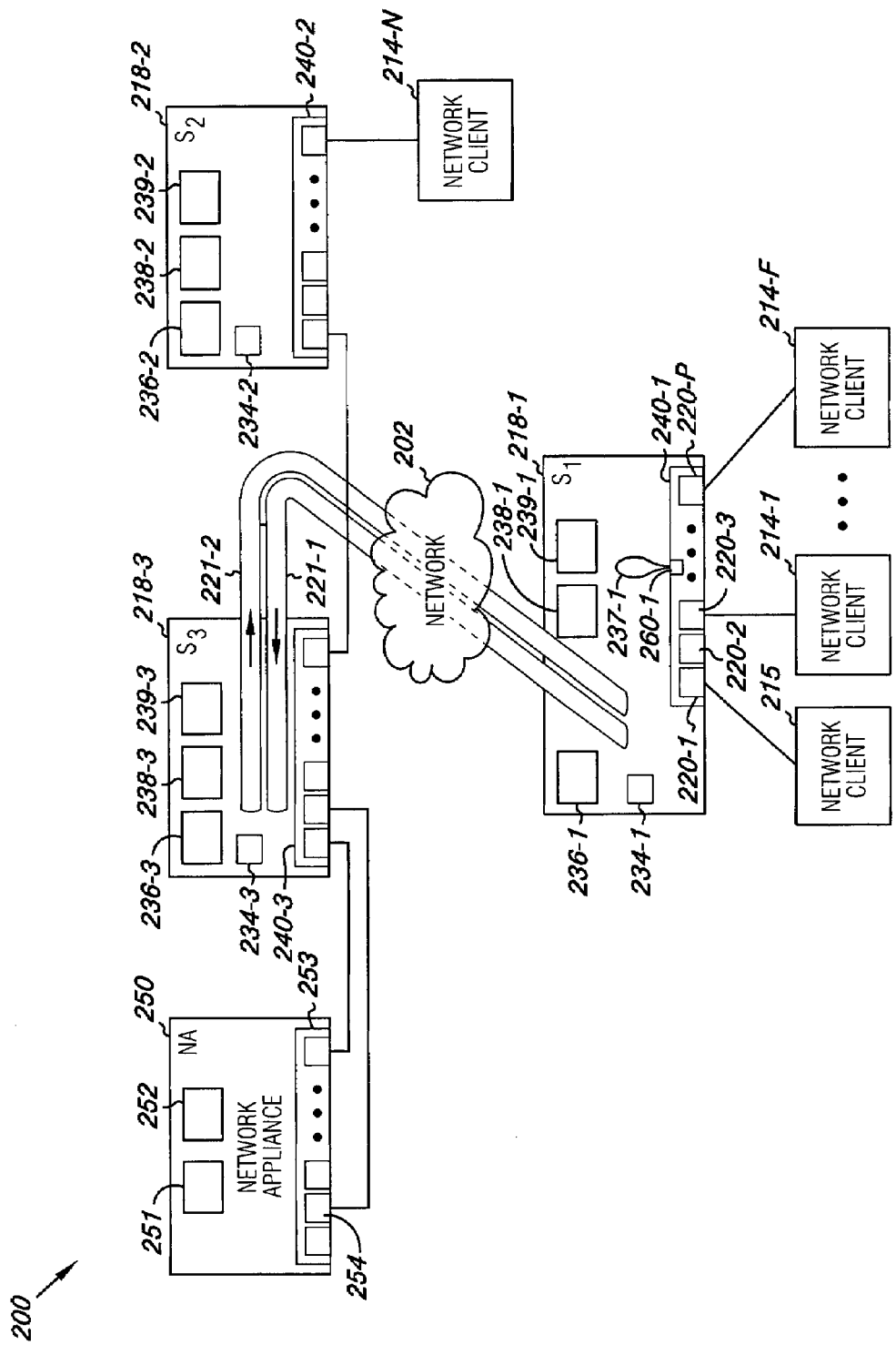
FIG. 2 illustrates a portion of a network, such as shown in FIG. 1, having network devices which can implement embodiments of the present invention.

FIG. 2 illustrates a portion 200 of a network, e.g., network 100 shown in FIG. 1, including embodiments of various network devices, 218-1, . . . , 218-3 suited to implement techniques of the present disclosure. As described above, certain devices described herein may be referred to topographically in a network as "edge network devices" and other network devices described herein may be referred to topographically in a network as "central network devices". As shown in the embodiment of FIG. 2, a checking functionality, e.g., network appliance 250, has been located in a "centralized" location relative to a given network architecture, e.g. associated with switch 118-3 in network 100 of FIG. 1. As the reader will appreciate, this example embodiment of the centralized location in FIG. 1 or 2, however, does not require association of the checking functionality with a central network device. That is, the centralized location of the checking functionality, e.g., network appliance 250, may alternatively be associated with an edge network devices having ports connected directly to "fat" and "thin" network clients, e.g., 114-1, . . . , 114-N and 115-1, . . . 115-M. of FIG. 1. In some embodiments a checking functionality may even be associated with network clients connected through an APC, etc., as discussed above in connection with FIG. 1.

As described in connection with FIG. 1, the various network devices shown in FIG. 2, 218-1, 218-2, 218-3, etc., can include switches, routers, hubs, etc. Such network devices, 218-1, . . . , 218-3, can include processor(s), e.g., 236-1, . . . , 236-3, and memory, e.g., 238-1, . . . , 238-3, resources. The network devices, 218-1, . . . , 218-3 can similarly include a number of network chips, e.g., 240-1, . . . , 240-3, including logic circuitry (hardware) which can execute instructions and/or logic and each network chip, 240-1, . . . , 240-3, can include a number of network ports, 220-1, 220-2, . . . , 220-P, to send and receive data packets (network traffic) throughout the network 200. As mentioned above, the logic circuitry of the number of network chips, e.g., 240-1, . . . 240-3, can be in the form of an application specific integrated circuit (ASIC) and include logic to serve as a media access controller (MAC).

As shown in FIG. 2, a number of ports 220-1, 220-2, . . . , 220-P can be included on a network chip e.g., 240-1, . . . , 240-3 and have access to logic circuitry associated with a network chip 240-1, . . . , 240-3 and to the processor 236-1, . . . , 236-3 and memory 238-1, . . . , 238-3. A crossbar, crosslink, and/or switching fabric 239-1, . . . , 239-3, as the same will be understood by one of ordinary skill in the art, can connect multiple ports 220-1, 220-2, . . . , 220-P and/or multiple chips 240-1, . . . , 240-3. As shown in the embodiment of FIG. 2, each network device, 218-1, . . . , 218-3, includes a lookup table, 234-1, . . . 234-3, (described further in connection with FIG. 4) associating MAC source address information and physical port information, 220-1, 220-2, . . . , 220-P.

As shown in FIG. 2, a network appliance 250 can be connected to a network device, e.g., 218-3, which may be a central network device. The network appliance 250 could also be implemented as a part of switch 218-3. As shown in FIG. 2, the network appliance 250 can include processor 251 and memory 252 resources capable of storing and executing instructions to perform a particular role or function. The network appliance can also include one or more chips (ASICs), e.g., 253, having logic and a number of ports 254, as ports have been described above.

In various embodiments, the network appliance 250 is an intrusion prevention system (IPS), as may be supplied by a third party vendor of network security devices. In various embodiments, the network appliance 250 can be an intrusion detections system (IDS), another diagnostic device, an accounting device, a counting device, etc., as may be supplied by a third party vendor. Embodiments are not limited to the examples given here. Further, the various operations of such devices will be recognized and understood by one of ordinary skill in the art.

As shown herein, example embodiments of the present disclosure include network devices, systems, and methods, having logic to tunnel packets on a network based on a number of criteria. As described in connection with FIG. 2, embodiments include a network device that includes a network chip having a number of network ports for the device. The network chip includes logic to select original data packets received from or destined to a particular port on the device, based on a number of criteria, and to tunnel the selected data packets to a second network device different from an original destination address of the selected data packets, e.g., illustrated as tunneled through network 202. An example of logic to select original data packets received from or destined to a particular port, e.g., 220-1, . . . , 220-P, on the device, based on a number of criteria, and to tunnel (using tunnel encapsulation) the selected data packets to a second network device different from an original destination address of the selected data packets is provided in co-pending, co-assigned U.S. patent application Ser. No. 11/712,706, entitled, "Packet Tunneling, filed on Mar. 1, 2007, having common inventorship. The same is incorporated herein in full by reference.

According to embodiments, network devices being monitored do not each have to include an in-line network appliance, e.g., in-line IS. That is, rather than having an IS at each of the network devices, or achieving less than full network coverage, embodiments of the present disclosure provide an IS at a selected location, or locations, which can be used to receive tunneled, selected data packets to assess data traffic anomalies associated with packets that are not ordinarily passing through ports on a network device associated with the IS.

In the embodiment of FIG. 2, a network packet, e.g., data packet, is received from a port, e.g., 220-1, on a network device, e.g., switch 218-1, from a network client, e.g., 215. The port from which the data packet is initially received at a network device, e.g., from a network client, is referred to in this discussion as an "original" port, or equivalently, the initial ingress port. For example with respect to FIG. 2, port 220-1 is the original port through which data packets originating from network client 215 arrive at network device 218-1. Stated alternatively, port 220-1 is the initial ingress port for data packets arriving at network device 218-1 from network client 215. The data packet, as it is received from a port, e.g., 220-1, on a network device, e.g., switch 218-1, from a network client, e.g., 215, is referred to hereinafter as an original packet.

As one of ordinary skill in the art will appreciate, certain information is associated with each port. For example, a given port, e.g., 220-1, may be associated with one or more particular VLANs. Additionally, by way of example and not by way of limitation, port 220-1 may have other information associated with the port 220-1 such as source port filter information as the same will be understood by one of ordinary skill in the art. The source port information may include instructions and rules used by regular packet forwarding logic on the device 218-1 to determine which packets received from port 220-1 and destined to another port, e.g., 220-2, . . . , 220-P, may be sent to the other ports, 220-2, . . . , 220-P. For example, and referring to FIG. 2, the source port information associated with port 220-1 may indicate that a packet received from port 220-1 and destined ports 220-2 and 220-P is allowable, but forwarding the packet to port 220-3 is prohibited.

According to embodiments described herein, if a packet is stolen from a particular port, e.g., 220-1, and tunneled to a checking functionality and then later returned to the network device 218-1, then the returned packet may be received from a different port, e.g., port 220-2, upon its return. As the reader will appreciate, port 220-2 may not have the same information, e.g., VLAN membership, port filter information, etc., as the information associated with port 220-1. As described in further detail below, embodiments of the present invention provide a method to locate the original port information for a packet returned from a checking functionality such that the packet can be operated upon by regular forwarding logic as if the packet had not been stolen to be cleared/approved by the checking functionality.

As noted above, co-pending, co-assigned U.S. patent application Ser. No. 11/712,706, entitled, "Packet Tunneling, filed on Mar. 1, 2007, having common inventorship, provides an example of logic on a network device, e.g., 218-1, to select original data packets received from or destined to a particular port, e.g., 220-1, . . . , 220-P, on the device, based on a number of criteria, and to tunnel encapsulate the selected data packets to a second network device, e.g., 218-3, different from an original destination address of the selected data packets. The same is incorporated herein in full by reference. Such packets could then be operated upon by a checking functionality, e.g., 250, associated therewith, and cleared, e.g., approved, packets can be returned to the originating network device, e.g., 218-3, using a method such as described in the above cited co-pending application.

Figure 3:
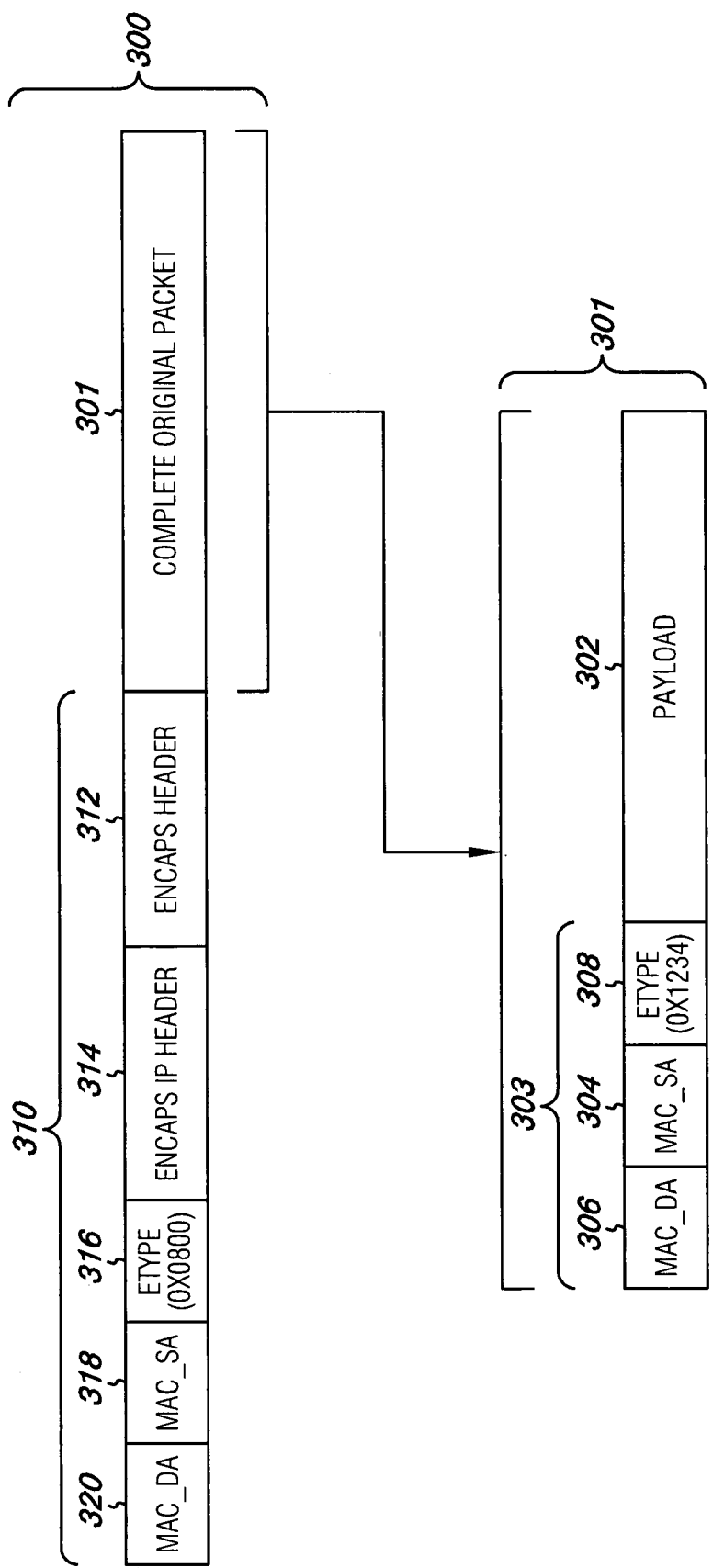
FIG. 3 illustrates an example tunnel de-encapsulation of a packet according to an embodiment of the present invention.

FIG. 3 illustrates one example embodiment an encapsulated packet 300 being returned to the originating network device, e.g., 218-1 in FIG. 2, subsequent to the original packet 301 having been cleared, e.g., approved, by a checking functionality, e.g., 250 in FIG. 2. As shown in FIG. 3, the returned encapsulated packet 300 includes the original packet 301 and encapsulation information 310. The encapsulation information 310 can include an encapsulation header 312, such as a generic routing encapsulation (GRE) header. Other encapsulation header 312 examples include Ethernet-within-IP (RFC3378), Layer 2 Tunneling Protocol (L2TP-RFC3931), etc. The encapsulation information 310 can also include an encapsulation internet protocol (IP) header 314, an Ethernet type header 316, a source MAC address 318 (MAC_SA), and a destination MAC address 320 (MAC_DA), etc.

The original packet 301 includes the packet's original payload 302, e.g., the data content, and the packet's original header information 303. As illustrated in FIG. 3, the original header information 303 includes the original source MAC address 304 (MAC_SA), the original destination MAC address 306 (MAC_DA), and can include Ethernet type information 308, among other information.

As mentioned above, however, the encapsulated packet 300 shown in FIG. 3 may be returned to the originating network device, e.g., 218-1 in FIG. 2, through a port, e.g., 220-2, . . . , 220-P, which is different from an original port, e.g., 220-1, through which the original packet 301 initially ingressed to network device 218-1, for example, from a network client, e.g., network client 215. This different port, e.g., 220-2, . . . , 220-N, may have port information, as described above, which is different from the port information associated with the original port, 220-1. Accordingly, as described next, logic embodiments of the present invention will operate to decapsulate the returned packet 300 and to locate the original port information for the original packet 301.

Thereafter, the network device 218-1 includes logic to apply regular packet forwarding logic to the packet to send the original data packet 301 to the destination MAC address (MAC_DA) 306 in the same manner as if the original packet 301 had not been stolen to, and operated upon, by the checking functionality, e.g., 250 in FIG. 2. As one of ordinary skill in the art will appreciate upon reading the embodiments described herein, the tunnel encapsulation of the original packet 301 is not part of the regular packet forwarding logic.

Figure 4:
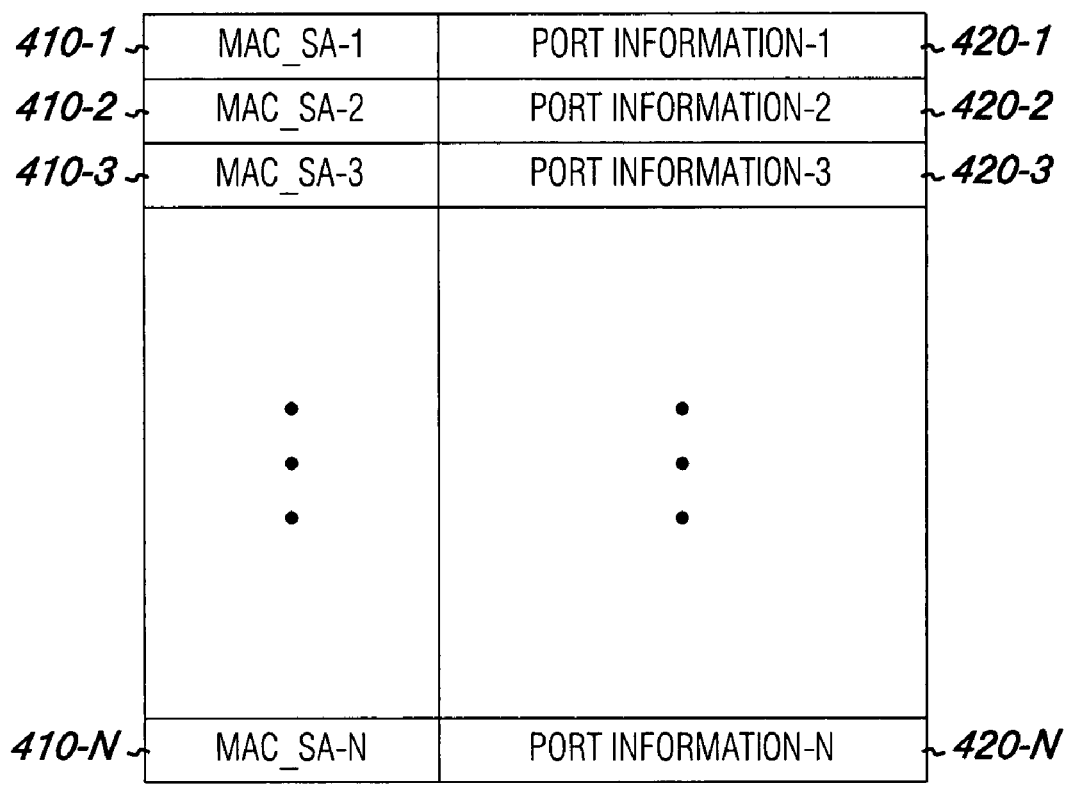
FIG. 4 illustrates an example lookup table used to locate original port information according to an embodiment of the present invention.

FIG. 4 illustrates one example embodiment of a lookup table 400 relating MAC source addresses (MAC_SA), e.g., 410-1, 410-2, 410-3, . . . 410-N, with associated port information, e.g., 420-1, 420-2, 420-3, . . . 420-N. The designator "N" is used to indicate that table 400 may contain a number of relational entries between MAC_SA and port information. Such a lookup table 400 can be implemented using a search implementation, e.g., hash tables, Binary Content Addressable Memory (BCAM), etc. As MAC addresses are routinely used to forward data packets to an appropriate port to physically reach a destination, the association between MAC address and physical port is already known to a switch, e.g., 218-1, via a learn process, as will be understood by one of ordinary skill in the art. Additionally, the forwarding process operating on the original packet may have confirmed that this source MAC belongs to the initial incoming physical port (e.g., referred to as "MAC port lockdown"). Because the method of certain embodiments of the present invention preserves the complete original packet, e.g., 301 in FIG. 3, including the original MAC source address (MAC_SA), 304 in FIG. 3, the original MAC source address (i.e., MAC_SA) can be used to identify the port through which the original packet initially arrived at the network device. Therefore, a MAC source address can be related to information associated with the port through which the original packet initially arrived to the network device, for example by lookup table 400. As described in more detail in connection with FIG. 5A, if the lookup table search fails the packet may be diverted to exception processing, e.g., 520 in FIG. 5A.

The original port information, determined from the lookup table search, is used internal to the network device in forwarding a packet on to its MAC destination address, i.e., the original packet is not modified with the original port information, and thus the original port information does not travel with the packet out to the next network device. The original port information is used in much the same manner by the network device as ingress port information is used for a packet initially arriving at the network device is used. By using the original port information, rather the tunnel egress port information, the packet now appears to have arrived on its original port (i.e., the port of its initial ingress to the network device), and so during regular forwarding will generate port-specific data appropriate to its original ingress port. Examples of port-specific data generated include source port filter information (i.e., identification of other ports in a switch network device the original port is allowed to send packet traffic to) and VLAN information (i.e., identification of the VLAN the packet is associated with based on the initial ingress port and network configuration programming). These examples are not exhaustive, and the port-specific data generated may include other attributes used in processing a packet during regular forwarding protocols.

According to one example embodiment of the present invention, the original port information (e.g., PORT INFORMATION-1 420-1) returned from the lookup table search using the MAC source address (e.g., MAC_SA-1 410-1), e.g., 304 in FIG. 3, is identification of the original port (e.g., 220-1). The original port identification is used to redo any lookups based upon port input, e.g., to retrieve other information associated with the identified port. In this manner, ingress port information (i.e., original port information) can be located after a packet is returned from a checking, or other remotely-located, functionality.

Figure 5A:
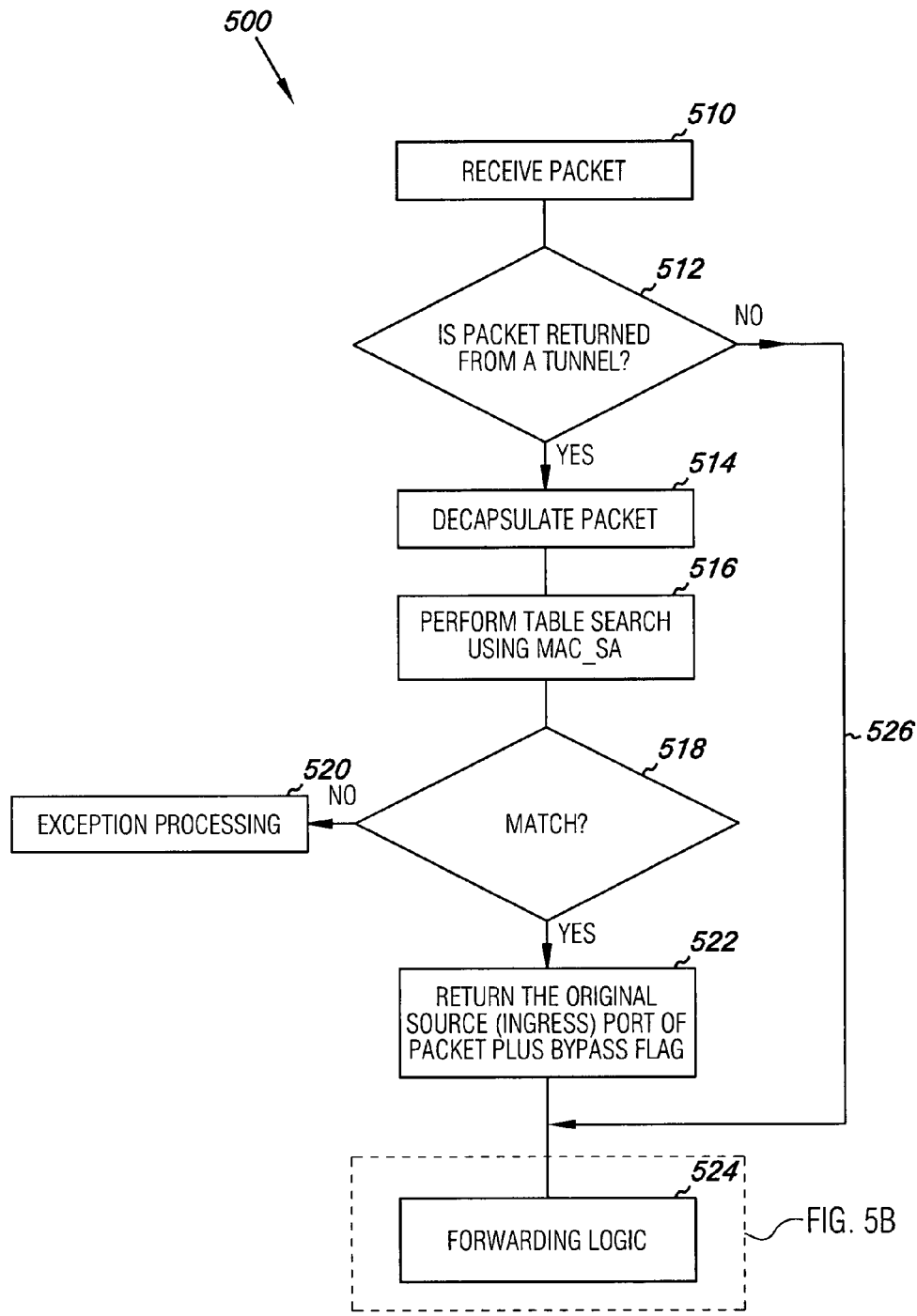
FIG. 5A provides a flow chart illustrating one method for locating original port information according to an embodiment of the present invention.
Figure 5B:
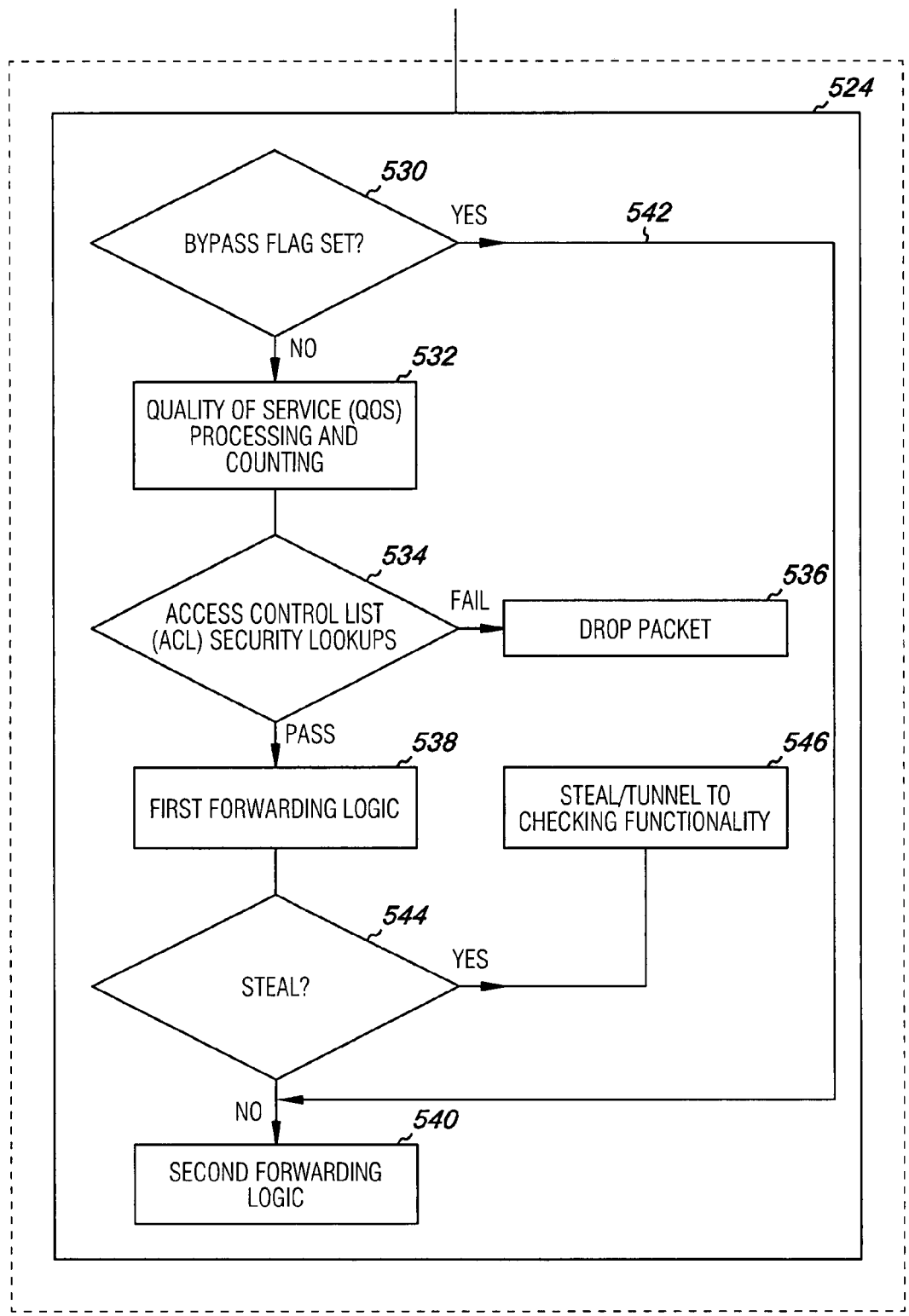
FIG. 5B provides a flow chart illustrating one method for applying forwarding logic according to an embodiment of the present invention.

FIGS. 5A and 5B illustrate one method 500 for implementing original port information restoration according to an example embodiment of the present invention. A network packet is received 510 at a network device, e.g., 218-1 in FIG. 2. Network packets returning from the checking functionality do not necessarily arrive at a network device by the same port after tunnel transport as the port through which their initial ingress to the network device occurred. Packets cleared by the checking functionality are returned to the network device, e.g., 218-1, from which they were originally tunneled from, to continue on in the forwarding process to the MAC destination address of the original packet. The constraints and process followed by the network device in forwarding a packet on to its MAC destination address is directed and/or constrained by information associated with the ingress port through which the packet arrived to the network device, as will be appreciated by one having ordinary skill in the relevant art.

According to embodiments, logic on the network device recognizes from the encapsulation information, e.g., 310 in FIG. 3, that the packet is being returned from a tunnel at 512, e.g., returned from a checking functionality such as a network appliance 250 in FIG. 2. As described above, the logic removes the encapsulation, i.e. decapsulates the packet, at 514 to remove encapsulation information, e.g., 310 in FIG. 3, leaving just the original packet, e.g., 301 in FIG. 3. As shown at block 516, the logic then performs a table search using the original MAC_SA (304 in FIG. 3) as the key, i.e., performs a lookup using lookup table 400 in FIG. 4, 234-1 in FIG. 2, as the key to determine a match 518. If a matching MAC_SA is found, port information associated with the original source port, e.g., 220-1 in FIG. 2 from which the original packet initially ingressed the network device, is returned and a bypass flag is set 522. If the lookup table search does not find a matching MAC_SA, as can be the case if the device is incorrectly configured or under transient conditions (e.g., the client having a given MAC address is unplugged from the network, etc.), the packet is diverted to exception processing as shown at 520. As one of ordinary skill in the art will appreciate the instances where a matching MAC_SA is not found in the look up table search may be an infrequent occurrence and hence is treated as exception processing.

If a match is found during the lookup table search using MAC_SA, a bypass flag is associated with the packet at step 522 to indicate that the packet has undergone the source port information location process, i.e., locating original port information for use by the forwarding logic. Equivalently, a "source port restoration" flag can be set, or other identifier made, from which an indication that certain portions of the regular packet forwarding logic are to be bypassed as described in the embodiment of FIG. 5B. As shown at block 524 regular packet forwarding logic is then applied to the packet.

FIG. 5B provides a flow chart illustrating one method for applying forwarding logic according to an embodiment of the present invention. As shown in the embodiment of FIG. 5B, as the packet is undergoing processing of the regular forwarding logic 524, a determination is made as to whether the bypass flag is set 530. Non-initial packet ingress to a network device, as is the case when a packet is tunnel-returned from a checking functionality, causes the bypass flag to be set. If the bypass flag associated with a packet is set, certain packet processing steps are bypassed as indicated by path 542 in FIG. 5B. The packet will, however, still have previous unapplied regular packet forwarding logic applied to it as shown at block 540.

If the bypass flag associated with a packet is not set, indicative of the packet just arriving at the network device for the first time (i.e., initial ingress of an original packet), certain portions of the regular packet forwarding logic will be applied, i.e., not bypassed, even before a packet is selected to be stolen away to a checking functionality. For example, an original packet on initial ingress to a network device may be subjected to quality of service (QoS) processing 532 such as counting, metering and/or accounting, etc., and/or may be subjected to access control list (ACL) security lookups 534 as part of the initial regular packet forwarding logic. If a packet fails ACL security lookup screening, it may, for example, be dropped 536, or otherwise processed accordingly.

In some embodiments, if a packet passes ACL security lookup screening, the packet may then have some additional initial regular packet forwarding logic 538 applied thereto even if the packet is selected to be stolen away to a checking functionality, e.g., block 546. As shown in the embodiment of FIG. 5B, this additional regular packet forwarding logic 538 may be bypassed for packets returning to the network device from the tunnel, e.g., not initially arriving at the network device.

As shown in the example embodiment of FIG. 5B, at some point logic will operate on a packet which is originally received from a port on a network device, e.g., does not have a bypass flag set as determined at 530, to assess whether the packet may be a suspicious packet and should be "tunnel stolen" to a checking functionality as reflected by decision block 544. If the logic determines the packet should be tunnel stolen, then the logic may operate to steal/tunnel the packet to a checking functionality as reflected in block 546. An example of logic, as shown in block 546, for tunneling packets off to a remote, e.g., centralized, checking functionality is described in co-pending, co-assigned U.S. patent application Ser. No. 11/712,706, entitled, "Packet Tunneling", filed on Mar. 1, 2007, and having common inventorship.

As shown in the embodiment of FIG. 5B, if the packet is not to be stolen as determined at 544 or if the packet is a packet not initially arriving at the network device, e.g., had a bypass flag set as determined at 530 and forwarded by path 542, the logic will operate to either continue applying regular packet forwarding logic and/or have non-previously applied regular packet forwarding logic applied to such packets as shown at block 540.

As one having ordinary skill in the relevant art will appreciate, setting of the bypass flag associated with a particular packet causes processing which is done to a packet on initial ingress to not be duplicated on subsequent ingress of the packet to the network device. Logic can recognize if a given packet has already been checked, i.e., inspected and "cleared", so as not to return the packet to be checked once again in duplicative fashion. Certain portions of the regular packet forwarding logic will be bypassed for such cleared, e.g., approved, packets in a manner which avoids duplicative actions. For example, logic will locate the original port information and then apply the regular packet forwarding logic to a packet in a manner so as not to re-apply any logic that would change counter or rate values and distort any respective metric being measured by such logic. As the reader will appreciate, re-applying such logic would "double count" the packet that has already had that portion of the regular packet forwarding logic applied thereto. As mentioned above, if a received packet is not being returned to the network device from a checking functionality, the packet will not have a bypass flag set in association therewith, and the packet will begin having regular packet forwarding logic applied, thereby circumventing the table look up search 516 as reflected by the "No" decision path 526 as shown on FIG. 5A.

For returned packets, as shown in the embodiment of FIG. 5B, ACL security lookups will already have been performed on initial ingress of a packet to the network device, so it would not be necessary or desirable to duplicate such ACL security lookups. As one of ordinary skill in the art will appreciate upon reading the embodiments of the present invention, avoiding such duplication can improve packet processing time and/or bandwidth usage and avoid counting the same packet multiple times during duplicate lookups.

In some embodiments the packet processing timing involved with decapsulating a returned packet may employ logic to egress and ingress a packet through a loopback port, e.g., 260-1 in FIG. 2, associated with a loopback circuit, e.g., 237-1 in FIG. 2. More than one loopback port may included with a given network device and their performance may be different, e.g., some may be 1 Gbit, some could be 10 Gbit, etc. Such loopback ports can be grouped together (e.g., "trunked" or "aggregated" as one of ordinary skill in the art will understand) to give a greater loopback capacity. As described above, a tunnel-returned network packet has to have its tunnel encapsulation removed in addition to other processing steps (e.g., original port information located, etc.) necessary to derive and appropriately re-integrate the original packet back into the normal forwarding logic. To the extent that all of the previously described steps cannot be timely accomplished, a packet in the process of locating original port information may be forwarded to (i.e., through) a loopback port, or buffer, as required for appropriate processing within system constraints. In such embodiments, as a packet is received from the loopback port the logic will continue at block 516 in FIG. 5A to perform the table search using the MAC_SA to locate original port information, e.g., port VLAN membership, port filter information, etc. for use by the regular packet forwarding logic.

Further it is noted, that a network may include multiple network appliances, e.g., 250 in FIG. 2, that are performing different functions and require different actions when a packet is returned to the originating network device, e.g., 218-1 in FIG. 2, and looped back. For example, the embodiment of FIG. 5B has been described in connection with an IS and location of original port information and skipping certain lookups, e.g., ACL, QOS, etc., associated with the regular forwarding logic on the packet's return. However, some embodiments may include a different network appliance/application that may need ACUQOS processing to occur on packet return and loopback. In such embodiments a given loopback port may be associated with a particular network appliance, and have the capability of supporting multiple network appliances through multiple groups of loopback ports.

Figure 6:
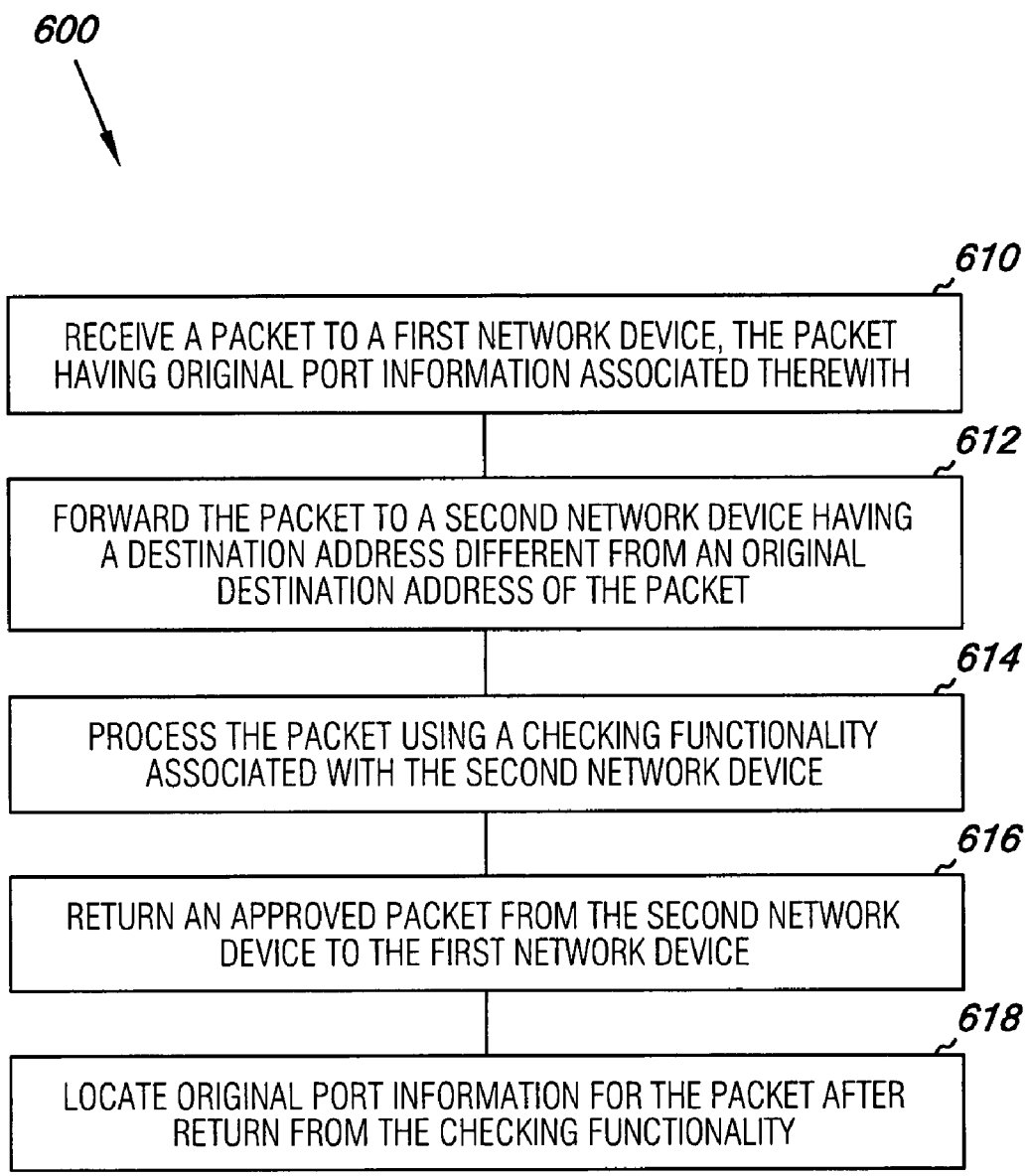
FIG. 6 illustrates a method for processing data packets.

FIG. 6 illustrates a method 600 for processing data packets. The method includes receiving a packet to a first network device, the packet having original port information associated therewith, as shown at block 610. Block 612 illustrates forwarding the packet to a second network device having a destination address different from an original destination address of the packet. Block 614 illustrates processing the packet using a checking functionality associated with the second network device. The method further includes returning an approved packet from the second network device to the first network device as shown at block 616. Block 618 illustrates locating original port information for the packet after return from the checking functionality.

It is to be understood that the above description has been made in an illustrative fashion, and not a restrictive one. Although specific embodiments have been illustrated and described herein, those of ordinary skill in the art will appreciate that other component arrangements and device logic can be substituted for the specific embodiments shown. The claims are intended to cover such adaptations or variations of various embodiments of the disclosure, except to the extent limited by the prior art.

In the foregoing Detailed Description, various features are grouped together in a single embodiment for the purpose of streamlining the disclosure. This method of disclosure is not to be interpreted as reflecting an intention that any claim requires more features than are expressly recited in the claim. Rather, as the following claims reflect, inventive subject matter lies in less than all features of a single disclosed embodiment. Thus, the following claims are hereby incorporated into the Detailed Description, with each claim standing on its own as a separate embodiment of the invention.

What is claimed is:

1. A network device, comprising:
    a plurality of network ports for receiving and transmitting packets therefrom; and
    a logic circuitry coupled to the plurality of network ports, wherein the logic circuitry is configured to:
        receive a packet, the packet having original ingress port information associated therewith;
        forward the packet to a second network device having a destination address different from an original destination address of the packet, wherein the second network device processes the packet using a checking functionality;
        receive the packet after clearance by the checking functionality;
        determine that the packet is to bypass one or more functions of a regular forwarding protocol;
        locate original ingress port information of the packet after clearance by the checking functionality; and
        forward the packet to the original destination address using the original ingress port information according to the regular forwarding protocol bypassing the one or more functions.

2. The network device of claim 1, wherein the original ingress port information is associated with a port of the plurality of network ports through which the packet's initial ingress to the network device occurred.

3. The network device of claim 1, wherein the logic circuitry performs a lookup to locate the original ingress port information.

4. The network device of claim 3, wherein the logic circuitry performs the lookup using the packet's initial media access control (MAC) source address.

5. The network device of claim 1, wherein the packet is received after clearance by the checking functionality tunnel-encapsulated, and the logic circuitry decapsulates the packet.

6. The network device of claim 1, wherein the logic circuitry flags the packet being received after clearance by the checking functionality to indicate the packet is to bypass the one or more functions.

7. A network, comprising:
    a first network device having a plurality of network ports for receiving and transmitting packets therefrom, and a logic circuitry coupled to the plurality of network ports, wherein the logic circuitry of the first network device is operable to:
        receive a packet, the packet having original ingress port information associated therewith;
        forward the packet;
        receive the packet after clearance by a checking functionality;
        determine that the packet is to bypass one or more functions of a regular forwarding protocol;
        locate original ingress port information of the packet after clearance by the checking functionality; and
        forward the packet to an original destination address of the packet using the original ingress port information according to the regular forwarding protocol bypassing the one or more functions; and
    a number of second network devices communicatively coupled to the first network device, at least one of the second network devices having a plurality of network ports and a logic circuitry coupled to the plurality of network ports, wherein the logic circuitry of the at least one of the second network devices is operable to:
        receive the packet forwarded by the first network device, wherein the at least one of the second network devices having a destination address different from the original destination address of the packet;
        process the packet using a checking functionality; and
        transmit the packet after processing to the first network device.

8. The network of claim 7, wherein the logic circuitry of the first network device bypasses a quality of service function of the regular forwarding protocol.

9. The network of claim 7, wherein the logic circuitry bypasses a security function of the regular forwarding protocol.

10. The network of claim 9, wherein the security function includes an access control list security lookup.

11. The network of claim 7, wherein the original ingress port information includes virtual local area network (VLAN) information.

12. The network of claim 7, wherein the original ingress port information includes source port filter information.

13. The network of claim 7, wherein the first network device includes a loopback port, wherein the logic circuitry of the first network device forwards the packet through the loopback port as part of locating original ingress port information of the packet.

14. A method for processing data packets, comprising:
    receiving a packet to a first network device, the packet having original ingress port information associated therewith;
    forwarding the packet to a second network device having a destination address different from an original destination address of the packet;
    processing the packet using a checking functionality associated with the second network device;
    returning the packet after processing to the first network device;
    determining that the packet is to bypass one or more functions of a regular forwarding protocol;
    locating original ingress port information for the packet after return from the checking functionality; and
    forwarding the packet to the original destination address using the original ingress port information according to the regular forwarding protocol bypassing the one or more functions.

15. The method of claim 14, further comprising:
    tunnel encapsulating selected packets to the second network device based on a number of criteria; and
    decapsulating selected packets returned from the second network device to locate original ingress port information.

16. The method of claim 15, wherein tunnel encapsulating selected packets includes tunnel encapsulating selected packets to the second network device over a secure tunnel.

17. The method of claim 14, wherein the method includes performing a lookup for selected packets returned from the second network device to associate original ingress port information with the selected packets using the packet's original media access control (MAC) source address.

18. The method of claim 14, wherein the method includes locating port filter information and virtual local area network (VLAN) information associated with an initial ingress port.

19. The method of claim 14, wherein the one or more functions of the regular forwarding protocol include at least one selected from the group of:
   a quality of service operation;
   a metering operation; and
   a counting operation.

20. The method of claim 1, wherein the packet is forwarded to an original MAC destination address associated with the packet.

* * * * *